United States Patent
Tamura

[19]

[11] Patent Number: 5,193,219
[45] Date of Patent: Mar. 9, 1993

[54] VEHICULAR POWER BOOSTER CIRCUITRY FOR MULTI-LEVEL PORTABLE TRANSCEIVER

[75] Inventor: Yoshiharu Tamura, Tokyo, Japan
[73] Assignee: NEC Corporation, Tokyo, Japan
[21] Appl. No.: 569,041
[22] Filed: Aug. 17, 1990
[30] Foreign Application Priority Data Aug. 18, 1989 [JP] Japan .................................. 1-212334

[51] Int. Cl.⁵ .............................................. H04B 1/38
[52] U.S. Cl. ........................................ 455/89; 455/95; 455/115; 455/127
[58] Field of Search ................... 455/127, 89, 95, 115, 455/116

[56] References Cited

U.S. PATENT DOCUMENTS

| | | | |
|---|---|---|---|
| 3,648,186 | 3/1972 | Kahn | 455/127 |
| 4,442,407 | 4/1984 | Apel | 455/127 |
| 4,585,903 | 4/1986 | Schiller et al. | 455/89 |
| 4,654,882 | 3/1987 | Ikeda | 455/89 |
| 5,048,117 | 9/1991 | Aisaka et al. | 455/127 |
| 5,086,508 | 2/1992 | Furuno | 455/127 |

*Primary Examiner*—Reinhard J. Eisenzopf
*Assistant Examiner*—Timothy H. Keough
*Attorney, Agent, or Firm*—Sughrue, Mion, Zinn, Macpeak & Seas

[57] ABSTRACT

A mobile radio transceiver comprises a portable transceiver and a vehicular power booster. The portable transceiver generates a RF transmit signal and sets the power of the RF signal at one of multiple power levels. The power booster is coupled by a connecting cable to the transceiver to receive the RF signal, and includes a first power detector for detecting the power of the received signal. One of multiple reference voltages is identified as corresponding to the power detected by the first power detector. A gain-controlled power amplifier stage amplifies the RF signal from the transceiver for coupling to an antenna. The output power of the power amplifier is detected and a gain control driver responds to a difference between it and the identified voltage by controlling the power amplifier so that the difference reduces to a minimum. In a modification, the power amplifier stage is a class C amplifier and the booster additionally includes a preamplifier stage. A second gain control driver is responsive to a difference between an average output voltage of the preamplifier stage and a fixed value for controlling the preamplifier so that its output is maintained constant. The output of the second gain control driver is used to identify one of the reference voltages supplied to the first gain control driver as corresponding to the power setting of the transceiver.

9 Claims, 2 Drawing Sheets

VEHICULAR POWER BOOSTER CIRCUITRY FOR MULTI-LEVEL PORTABLE TRANSCEIVER

BACKGROUND OF THE INVENTION

The present invention relates generally to mobile communications system, and more specifically to vehicular power booster circuitry for a duplex multi-level portable radio transceiver.

A mobile radio transceiver as shown and described in U.S. Pat. No. 4,636,741 has a portable radio transceiver and a vehicular adaptor having an antenna. When the portable transceiver is used in the vehicle, it is coupled to the adaptor to enable it to amplify the signal from the transceiver and transmit it from the antenna of the adaptor, instead of from the antenna of the transceiver. When the transceiver is used outside of the vehicle, it is disconnected from the adaptor and operates on a built-in battery to transmit signals from the transceiver antenna. A power control driver is provided in the transceiver unit to set its output power at one of several predetermined power levels. When the transceiver is operated on the adaptor mode for boosting power, the power level established in the transceiver is communicated to the adaptor in the form of an encoded signal. Therefore, the adaptor must be provided with a costly decoding circuit to receive the power level identification code to set the booster power level corresponding to the level set by the transceiver. Since the prior art transceiver has an antenna of its own and can generate sufficient power for direct transmission from the antenna, it can be used with a high degree of freedom outside of the vehicle. However, the circuitry for generating the necessary power for direct transmission from the transceiver occupies extra space and adds to its weight. It may be desirable that the transceiver be less bulky and unwieldy for use inside of the vehicle if there is no need to use it outside of the vehicle with the flexibility of the prior art.

SUMMARY OF THE INVENTION

It is therefore an object of the present invention to provide a low cost vehicular power booster circuitry for a multi-level portable transceiver wherein the amount necessary for correction is reduced.

According to a first aspect of this invention, there is provided a mobile radio transceiver which has a portable transceiver and a vehicular power booster. The portable transceiver generates a radiofrequency transmit signal and sets the power of the signal at one of several predetermined power levels. The vehicular power booster is coupled by a connecting cable to the portable transceiver to receive the RF transmit signal, and includes a first power detector for detecting the power of the RF transmit signal from the portable transceiver. A reference voltage source is provided for generating a set of reference voltages respectively representing the predetermined power levels. A decision circuit is provided for identifying one of the reference voltages as corresponding to the power detected by the first power detector. A variable-gain controlled power amplifier stage amplifies the RF transmit signal and applies it to a vehicle antenna. A second power detector detects the power of the power-amplified RF signal. A gain control driver is responsive to a difference between the power detected by the second power detector and the identified reference voltage for controlling the gain of the power amplifier stage so that the difference reduces to a minimum.

According to a second aspect of this invention, the vehicular power booster has a first, variable-gain controlled amplifier stage for amplifying the RF transmit signal received from the transceiver. A first detector is connected to the output of the amplifier to detect an average voltage of the amplified RF transmit signal. A first gain control driver is responsive to a first difference between the detected average voltage and a preselected reference voltage for generating a gain control voltage and applying it to the first amplifier stage so that the first difference reduces to a minimum. A reference voltage source generates multiple reference voltages respectively representing the predetermined power levels of the transceiver. Since the gain control voltage is variable with the power setting of the portable transceiver, a decision circuit uses this to determine which one of the reference voltages the transceiver's power setting corresponds to. A second, variable-gain controlled, class C power amplifier stage is provided for further amplifying the output of the first amplifier stage for application to a vehicle antenna. A power detector is connected to the output of the second amplifier stage. A second gain control driver is responsive to a second difference between the detected power and the identified reference voltage for controlling the gain of the second amplifier stage so that the detected power second difference substantially reduces to a minimum.

BRIEF DESCRIPTION OF THE DRAWINGS

The present invention will be described in further detail with reference to the accompanying drawings, in which.

DETAILED DESCRIPTION

Figure 1:
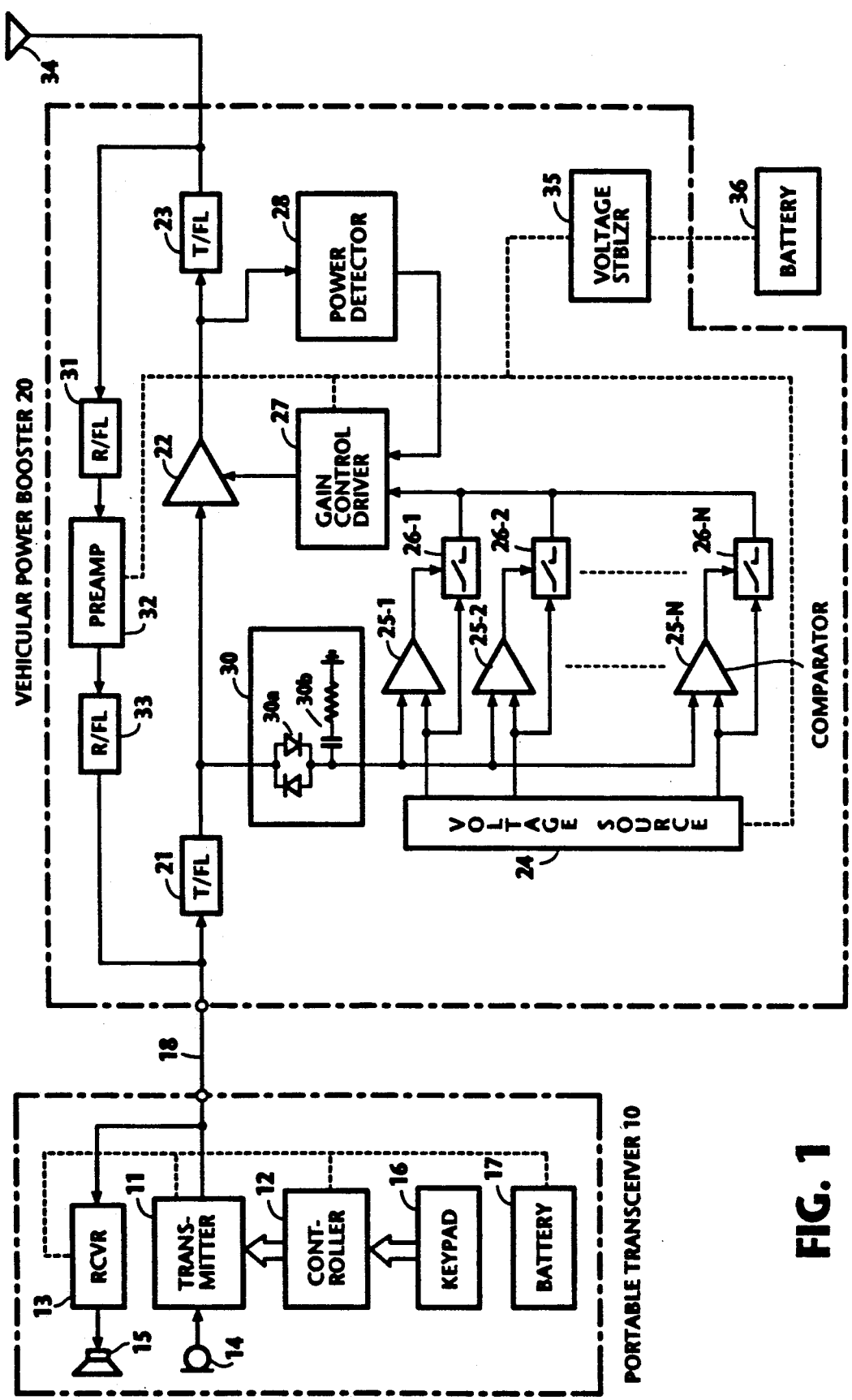
FIG. 1 is a block diagram of a mobile radio transceiver according to a first embodiment of the present invention.

Referring now to FIG. 1, there is shown a mobile radio transceiver according to a first embodiment of the present invention. The radio transceiver has a hand-held portable transceiver unit 10 and a vehicular power booster unit 20 which is permanently mounted in a vehicle and coupled by a connecting cable 18 to the portable transceiver unit. Connecting cable 18 has a sufficient length to allow users to leave the vehicle while carrying the hand-held unit 10. Transceiver 10 has a radio-frequency (RF) transmitter 11 which amplifies signals from a microphone 14, modulates it upon a radio-frequency carrier and amplifies the modulated carrier by a power amplifying stage for coupling through connecting cable 18 to power booster 20. The gain of the power amplifying stage of transmitter 11 is controlled by a controller 12 so that the power of radio-frequency transmit signal is set at one of several predetermined power setting levels. Usually, the difference between adjacent transmit power levels of the booster is specified as 4 dB, but it is sufficient to ensure a 2-dB difference between adjacent power levels at the output of transceiver 11. To controller 12, a keypad 16 is connected for dialing, power control and numeric data entry purposes. A radio-frequency receiver 13 is also coupled through connecting cable 18 to power booster 20 to receive RF receive signal from power booster 20 for reproduction by a speaker 15. All active modules of the portable unit 10 are powered by a battery 17 provided therein.

Vehicular power booster 20 includes a transmit filter 21 that separates the RF transmit signal from transmitter 11 from the RF receive signal and applies the separated transmit signal to a variable-gain controlled power amplifier stage 22, which amplifies the RF transmit signal with a variable gain which is controlled by a gain control driver 27. The amplified RF transmit signal from amplifier stage 22 is passed through a transmit filter 23 to an antenna 34 for transmission to a station that is connected to a public switched telephone network.

To the output of transmit filter 21 is connected a power detector 30. This detector has a rectifier 30a and an integrator 30b, and applies an average voltage representative of the power of the RF transmit signal to comparators 25-1 to 25-N. A reference voltage source 24 is provided for generating N reference voltages respectively representing the predetermined power levels established by the transceiver unit 10. The reference voltages are respectively applied to comparators 25-1 to 25-N in which the power-representative voltage from detector 30 is compared with each reference voltage to identify one of the reference voltages as corresponding to the detected power. The outputs of comparators 25-1 to 25-N are connected respectively to control inputs of switches 26-1 to 26-N to allow the identified reference voltage to be passed to a first control input of gain control driver 27. A power detector 28 of the same circuitry as power detector 30 is connected to the output of power amplifier stage 22 to supply a voltage representative of the power of the power-amplified RF transmit signal to a second control input of gain control driver 27.

Gain control driver 27 controls the gain of power amplifier stage 22 in a negative feedback loop so that the difference between the reference voltage identified by one of the comparators 25 and the power detected by power detector 28 is minimized. In this way, the output power of amplifier stage 22 is automatically adjusted to an amplified version of the power level originally set by transceiver 10.

Vehicular power booster 20 further includes a receive filter 31 coupled to antenna 34 to separate the RF receive signal from the RF transmit signal. The output of filter 31 is amplified by a preamplifier stage 32 and passed through another receive filter 33 and connecting cable 18 to receiver 13. All active modules of the power booster are powered from a voltage stabilizer 35 coupled to a vehicle battery 36. Therefore, the power drain units of the mobile radio transceiver are separated from the portable unit 10 to make it lightweight and easy to handle with a smallest possible number of lines bundled into the connecting cable 18. With the power level detection technique using circuits 28 and 30 of rectifier/integrator configuration, portable unit 10 and power booster 20 can be implemented without the requirement of complex coding and decoding circuitry.

If power amplifier stage 22 is implemented with a class C amplifier, it is desirable that the input level of the amplifier is maintained constant regardless of the power level setting of transceiver 10. In addition, when cable 18 is extended to fullest length it is desirable to minimize effects caused by noise which is introduced to cable 18 by electromagnetic coupling from the vehicle engine.

Figure 2:
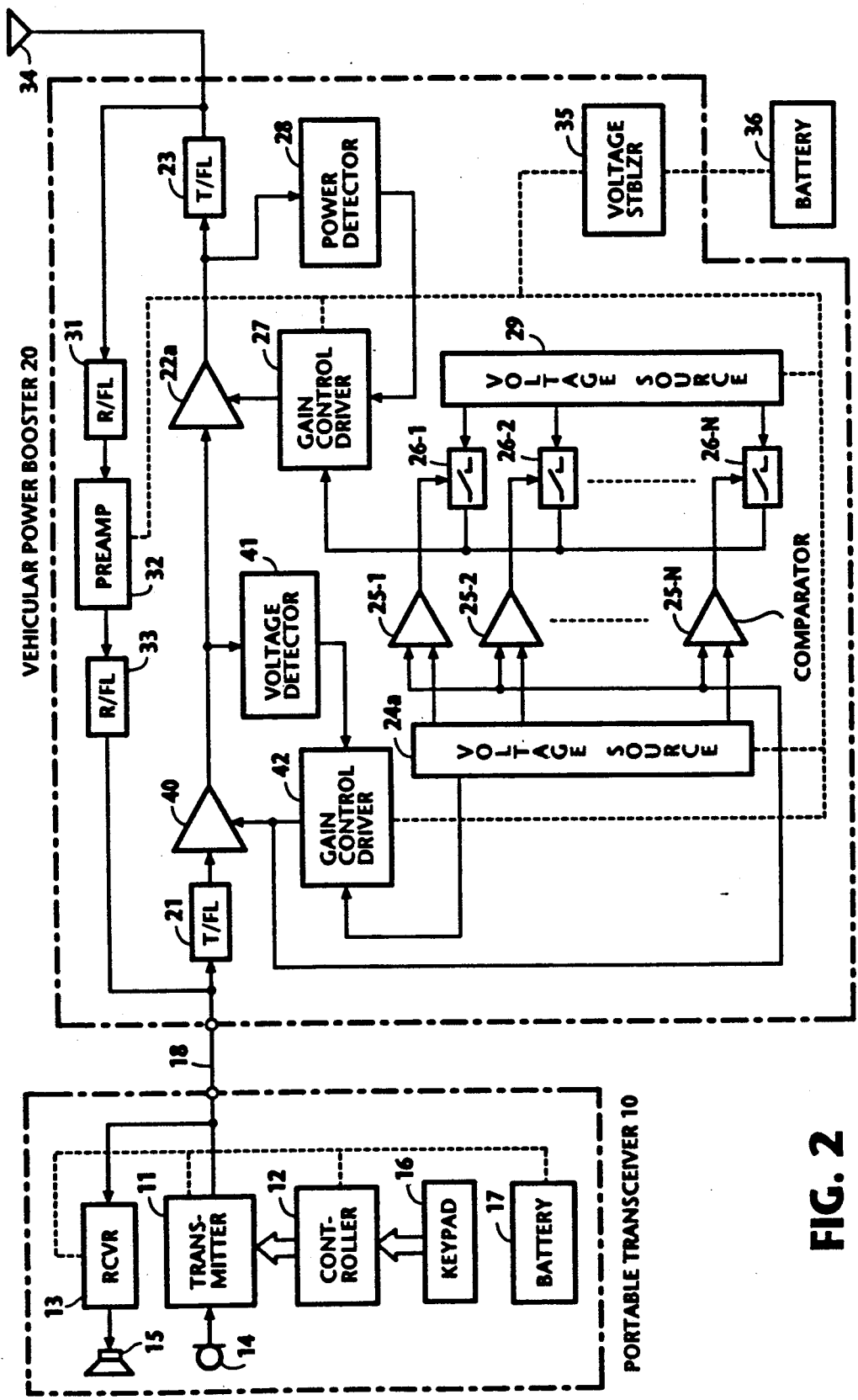
FIG. 2 is a block diagram of a mobile radio transceiver according to a second embodiment of the present invention.

In a modification shown in FIG. 2, a class C power amplifier stage 22a is used and a gain-controlled voltage amplifier stage 40 is provided between the filter 21 and power amplifier stage 22a to amplify the voltage level of the RF transmit signal. A voltage detector 41 of the same circuitry as power detector 30 of FIG. 1 is connected to the output of voltage amplifier stage 40 to generate a signal representative of an average voltage of the voltage-amplified RF transmit signal. A gain control driver 42 is provided to produce a gain control voltage that controls the gain of voltage amplifier 40 in a negative feedback mode in response to a difference between the output of voltage detector 41 and a preselected reference voltage supplied from a voltage source 24a. In this way, the difference is minimized and the output voltage of amplifier 40 is maintained constant at a level appropriate for the operation of power amplifier stage 22a.

Since the gain control voltage of the driver 42 is inversely variable with the power setting of transceiver 10, it is applied to comparators 25-1 to 25-N for comparison with reference voltages generated by voltage source 24a. One of the comparators 25 will produce an output to indicate that the corresponding reference voltage as corresponding to the transceiver's power setting and to operate the associated switching gate 26. A second reference voltage source 29 is provided for generating a set of second reference voltages which are appropriately established for the operation of gain control driver 27, but correspond respectively to those generated by voltage source 24a. The second reference voltages are supplied to switching gates 26-1 to 26-N. One of these voltages is passed through the operated switching gate to gain control driver 27 to permit it to drive the class C amplifier stage 22a in a negative feedback mode so that the difference between the reference voltage and the output of power detector 28 is minimized. The output of power amplifier 22a corresponds to the power setting of transceiver 10.

If noise impulses are introduced to the connecting cable 18, the negative feedback operation by voltage detector 41 and gain control driver 42 performs a smoothing action on the noise, stabilizing the booster's output power level.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A mobile radio transceiver comprising:
   a portable transceiver comprising a transmitter for generating a radio-frequency (RF) transmit signal, manual power setting means for setting said transmit signal at one of predetermined power levels and a receiver for receiving an RF receive signal; and
   a vehicular power booster coupled by a connecting cable to said portable transceiver to receive said RF transmit signal, comprising:
   first power detector means for detecting the power of the RF transmit signal received from the portable transceiver;
   voltage setting means for generating reference voltages respectively representing said predetermined power levels;

decision means for identifying one of said reference voltages as corresponding to the power detected by said first power detector means;

gain controlled power amplifying means for amplifying said RF transmit signal and applying the power-amplified RF transmit signal to an antenna;

second power detector means coupled to the output of said power amplifying means for detecting power of said power-amplified RF transmit signal; and gain control means responsive to a difference between the power detected by said second power detector means and said identified reference voltage for controlling the gain of said power amplifying means so that said difference is reduced to a minimum.

2. A mobile radio transceiver as claimed in claim 1, wherein said identifying means comprises:

comparator means for detecting a correspondence between the power detected by said first power detector means and one of said reference voltages to produce an output; and selector means for selecting one of said reference voltages in response to the output of said comparator means and applying the selected reference voltage to said gain control means.

3. A mobile radio transceiver as claimed in claim 1, wherein said portable transceiver is powered by a battery provided in said portable transceiver, and said vehicular power booster is powered by a vehicle battery.

4. A mobile radio transceiver as claimed in claim 1, wherein said vehicular power booster further includes a filter having a passband for filtering a signal received by said antenna and destined for said mobile radio transceiver and a preamplifier stage for applying an amplified version of the output signal of said filter to the receiver of said portable transceiver through said connecting cable as said RF receive signal.

5. A mobile radio transceiver comprising:

a portable transceiver comprising a transmitter for generating a radio-frequency (RF) transmit signal, manual power setting means for setting said RF transmit signal at one of predetermined power levels and a receiver for receiving an RF receive signal; and a vehicular power booster coupled by a connecting cable to said portable transceiver to receive said RF transmit signal, comprising:

first, gain controlled amplifying means for amplifying the RF transmit signal received from said portable transceiver;

first detector means coupled to said first amplifying means for detecting an average voltage of the amplified RF transmit signal;

first gain control means responsive to a first difference between the detected average voltage and a first reference voltage for controlling the gain of said first amplifying means with a gain control voltage so that said detected average voltage is maintained at a constant value;

second, gain controlled, class C power amplifying means coupled to said first amplifying means for further amplifying said amplified RF transmit signal and applying the power-amplified RF transmit signal to an antenna;

voltage setting means for generating second reference voltages respectively representing said predetermined power levels of said transceiver;

decision means for identifying one of said second reference voltages as corresponding to said gain control voltage of said first gain control means;

second detector means coupled to said second amplifying means for detecting power of the power-amplified RF transmit signal; and second gain control means responsive to a second difference between the power detected by the second detector means and the identified, second reference voltage for controlling the gain of said second, power amplifying means so that said power detected by the second detector means corresponds to the power level of said portable transceiver.

6. A mobile radio transceiver as claimed in claim 5, wherein said portable transceiver is powered by a battery provided in said portable transceiver, and said vehicular power booster is powered by a vehicle battery.

7. A mobile radio transceiver as claimed in claim 5, wherein said vehicular power booster further includes a filter having a passband for filtering a signal received by said antenna and destined to said mobile radio transceiver and a preamplifier stage for applying an amplified version of the output signal of said filter to the receiver of said portable transceiver through said connecting cable as said RF receive signal.

8. A mobile radio transceiver comprising:

a portable transceiver comprising a transmitter for generating a radio-frequency (RF) transmit signal and manual power setting means for setting said RF transmit signal at one of predetermined power levels; and a vehicular power booster coupled by a connecting cable to said portable transceiver to receive said RF transmit signal, comprising:

power detector means for detecting the power of the RF transmit signal received from the portable transceiver;

voltage setting means for generating reference voltages respectively representing said predetermined power levels;

decision means for identifying one of said reference voltages as corresponding to the power detected by said power detector means;

gain controlled power amplifying means for amplifying said RF transmit signal and applying the power-amplified RF signal to an antenna; and gain control means responsive to said identified reference voltage for controlling the gain of said power amplifying means to that output of said power amplifying means corresponds to the power level of said portable transceiver.

9. A mobile radio transceiver comprising:

a portable transceiver comprising means for generating a radio-frequency (RF) transmit signal and manual power setting means for setting said RF transmit signal at one of predetermined power levels; and a vehicular power booster coupled by a connecting cable to said portable transceiver to receive said RF transmit signal, comprising:

first, gain controlled amplifying means for amplifying the RF transmit signal received from said portable transceiver;

detector means coupled to said first amplifying means for detecting an average voltage of the amplified RF transmit signal;

first gain control means responsive to a difference between the detected average voltage and a first reference voltage for controlling the gain of said first amplifying means with a gain control voltage so that said detected voltage is maintained at a constant value;

second, gain controlled, class C power amplifying means coupled to said first amplifying means for further amplifying said amplified RF transmit signal and applying the power-amplified RF transmit signal to an antenna;

voltage setting means for generating second reference voltages respectively representing said predetermined power levels of said transceiver;

decision means for identifying one of said second reference voltages as corresponding to said gain control voltage of said first gain control means; and second gain control means responsive to the identified reference voltage for controlling the gain of said second, power amplifying means so that output of said second, power amplifying means corresponds to the power level of said portable transceiver.

* * * * *

UNITED STATES PATENT AND TRADEMARK OFFICE
CERTIFICATE OF CORRECTION

PATENT NO. : 5,193,219
DATED : March 9, 1993
INVENTOR(S) : Yoshiharu TAMURA

It is certified that error appears in the above-identified patent and that said Letters Patent is hereby corrected as shown below:

Col. 2, line 28, delete "detected power".

Signed and Sealed this

Eighteenth Day of January, 1994

Attest:

BRUCE LEHMAN

Attesting Officer

Commissioner of Patents and Trademarks